(12) United States Patent
Takayama (10) Patent No.: US 8,294,924 B2
(45) Date of Patent: Oct. 23, 2012

(54) PRINTING SYSTEM, PRINTING METHOD AND PRINTING APPARATUS

(75) Inventor: Hideaki Takayama, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1149 days.

(21) Appl. No.: 11/182,736

(22) Filed: Jul. 18, 2005

(65) Prior Publication Data

US 2006/0215208 A1  Sep. 28, 2006

(30) Foreign Application Priority Data

Mar. 22, 2005 (JP) ................. 2005-081695

(51) Int. Cl.
*G06F 3/12* (2006.01)
*G06K 15/22* (2006.01)

(52) U.S. Cl. ..................... 358/1.15; 358/1.14
(58) Field of Classification Search ............... 358/1.14, 358/1.15, 1.16, 1.9, 2.1; 709/200; 726/26
See application file for complete search history.

(56) References Cited

U.S. PATENT DOCUMENTS

| 6,667,810 | B1 * | 12/2003 | Jeyachandran et al. | 358/1.14 |
| 7,020,697 | B1 * | 3/2006 | Goodman et al. | 709/223 |
| 7,180,628 | B1 * | 2/2007 | Motohashi et al. | 358/1.9 |
| 7,385,720 | B2 * | 6/2008 | Bhatti | 358/1.15 |
| 7,605,935 | B2 * | 10/2009 | Nakamaki et al. | 358/1.15 |
| 2002/0186400 | A1 * | 12/2002 | Matsueda | 358/1.14 |
| 2005/0240745 | A1 * | 10/2005 | Iyer et al. | 711/167 |

FOREIGN PATENT DOCUMENTS

| JP | A 08-111734 | 4/1996 |
| JP | A 09-233239 | 9/1997 |
| JP | A 10-187388 | 7/1998 |
| JP | A 11-149354 | 6/1999 |

(Continued)

OTHER PUBLICATIONS

Jan. 5, 2010 Office Action issued in Japanese Patent Application No. 2005-081695 (with translation).

*Primary Examiner* — Gabriel Garcia
*Assistant Examiner* — Neil R McLean
(74) *Attorney, Agent, or Firm* — Oliff & Berridge, PLC (57) ABSTRACT

A printing system having an image reading apparatus and a printing apparatus which is network-connected or locally connected to the image reading apparatus, and which stores print jobs sent from the image reading apparatus or other apparatus in a queue, and implements printing processing sequentially from a print job existing at a head of the queue, in which the image reading apparatus comprises a print job cancel request unit that issues a cancel request for a print job to the printing apparatus, and the printing apparatus comprises: a cancel request reception unit that receives the cancel request sent by the print job cancel request unit; a cancel requester identifying unit that identifies a cancel requester from the cancel request received by the cancel request reception unit; a print job specifying unit that specifies, as a canceled print job, a print job which has been first searched out by searching for the print job from the cancel requester identified by the cancel requester identifying unit in a direction from a tail of the queue to the head thereof; and a print job cancel unit that deletes from the queue the canceled print job specified by the print job specifying unit.

10 Claims, 6 Drawing Sheets

FOREIGN PATENT DOCUMENTS

| | | | |
|---|---|---|---|
| JP | A 2001-007962 | | 1/2001 |
| JP | 2003177880 | * | 7/2001 |
| JP | B2 3252953 | | 11/2001 |
| JP | A 2002-196909 | | 7/2002 |
| JP | A-2002-262004 | | 9/2002 |
| JP | A 2003-177880 | | 6/2003 |
| JP | A 2003-341157 | | 12/2003 |
| JP | B2 3508752 | | 1/2004 |
| JP | A 2004-341921 | | 12/2004 |

* cited by examiner

| JOB ID | TIME AND DATE OF SENDING | SENDER EQUIPMENT TYPE INFORMATION | SENDER CONNECTION INFORMATION | PAGE DATA STORAGE ADDRESS |
|---|---|---|---|---|
| Job_0 | 2005.01.31 11:51:20 | PC | TCP/IP (192.168.1.128) | ○○○ |
| Job_1 | 2005.01.31 12:01:52 | PC | TCP/IP (192.168.1.129) | ○○○ |
| Job_2 | 2005.01.31 12:33:15 | Scanner | TCP/IP (192.168.1.130) | ○○○ |
| Job_3 | 2005.01.31 12:48:03 | PC | TCP/IP (192.168.1.128) | ○○○ |
| Job_4 | 2005.01.31 12:55:23 | Scanner | USB | ○○○ |
| Job_5 | 2005.01.31 13:00:18 | Scanner | TCP/IP (192.168.1.130) | ○○○ |
| Job_6 | 2005.01.31 13:00:37 | PC | TCP/IP (192.168.1.131) | ○○○ |
| Job_7 | 2005.01.31 13:05:01 | Scanner | TCP/IP (192.168.1.130) | ○○○ |
| Job_8 | 2005.01.31 13:08:03 | PC | TCP/IP (192.168.1.128) | ○○○ |
| Job_9 | 2005.01.31 13:10:10 | Scanner | USB | ○○○ |

FIG.6

PRINTING SYSTEM, PRINTING METHOD AND PRINTING APPARATUS

BACKGROUND OF THE INVENTION

1. Field of the Invention

The present invention relates to a printing system, printing method and printing apparatus which sequentially prints out print jobs stored in a queue, and particularly to a printing system, printing method and printing apparatus which are adapted to be able to cancel a particular print job by the operation from a print requester.

2. Description of the Related Art

In printing which is generally carried out in the printing apparatus, the print jobs which are requested to be printed are sequentially printed out in accordance with the order of being stored in a queue. At this time, the queue stores the print jobs on an FIFO (first-in first-out) basis, with which the print jobs are stored in the order of the printing request having been issued.

However, a print job which has been once requested to be printed may be canceled due to such a cause as an alteration of the printing conditions, and in this case, using the job cancel function of the printing apparatus will cause the print job at the head of those stored in the queue to be canceled. Thus a problem that a print job which is required to be canceled cannot be canceled is presented.

As a related art with which, when the data read out by means of the scanner section of a multi-function printer, in which the scanner section and the printer section are integrated to be housed in a single cabinet, is transferred directly to the printer section with no computer intervening, the print job can be canceled with no communication errors being caused, and no wasteful prints being produced, that disclosed in Japanese Patent Application Laid-Open No. 2002-262004 is available.

With this related art disclosed in Japanese Patent Application Laid-Open No. 2002-262004, a print job can be canceled in such a way that, when a cancel is received in the stand-alone copying, in which the data read-out by the scanner section is directly printed out by the printer section, the scanning operation of the scanner section is canceled, and in addition, the printing operation, including the print jobs remaining in the printer, is canceled.

However, with the related art as given in Japanese Patent Application Laid-Open No. 2002-262004, the scanning operation of the scanner section and the printing operation of the printer section are all canceled when the print job transferred to the printer section is canceled, thus, when a plurality of printing documents are continuously stand-alone copied, all the print jobs for the printing documents which have been requested to be printed are canceled, and even the print jobs which must be outputted for print are canceled, which causes problems that the operation efficiency is lowered, and the productivity is impaired.

Further, the printing system for the related art as given in Japanese Patent Application Laid-Open No. 2002-262004 is a multi-function printer, in which the scanner section and the printer section are integrated to be housed in a single cabinet, thus, there arises a problem that the destination of the printing output is limited, and the printing cannot be carried out at a desired destination of the printing output that is suited for the application.

In addition, with general systems, when the job cancel function, which causes the print queue, in which a plurality of print jobs are stored, to stop the outputting of a print job, is implemented, the print job at the head, which is to be the earliest printed among the print jobs stored is canceled, thus the print job which is to be canceled cannot be canceled.

Further, a related art with which, when a specific print job among a plurality of print jobs is to be canceled, the printing output is temporarily stopped, and then the display panel for the apparatus with which the specific print job is to be canceled is caused to collectively display the job information for the print jobs stored in the print queue for selection of the specific print job is available, however, with a higher-order device having a poor display function, the operability is not only unsatisfactory, but also more complicated processing is required, thus a problem that the cost necessary for the development is increased will be presented.

SUMMARY OF THE INVENTION

The present invention has been made in view of the above circumstances and provides a printing system, printing method and printing apparatus which allow a print job to be canceled from the printing requester by making a simple canceling operation.

An aspect of the present invention provides a printing system having an image reading apparatus and a printing apparatus which is network-connected or locally connected to the image reading apparatus, and which stores print jobs sent from the image reading apparatus or other apparatus in a queue, and implements printing processing sequentially from a print job existing at a head of the queue, in which the image reading apparatus includes: a print job cancel request unit that issues a cancel request for a print job to the printing apparatus, and the printing apparatus includes: a cancel request reception unit that receives the cancel request sent by the print job cancel request unit; a cancel requester identifying unit that identifies a cancel requester from the cancel request received by the cancel request reception unit; a print job specifying unit that specifies, as a canceled print job, a print job which has been first searched out by searching for the print job from the cancel requester identified by the cancel requester identifying unit in a direction from a tail of the queue to the head thereof; and a print job cancel unit that deletes from the queue the canceled print job specified by the print job specifying unit.

BRIEF DESCRIPTION OF THE DRAWINGS

Embodiments of the present invention will be described in detail based on the following figures, wherein.

DETAILED DESCRIPTION OF THE INVENTION

Hereinbelow, embodiments of the printing system, printing method and printing apparatus will be described in detail with reference to the attached drawings.

Figure 1:
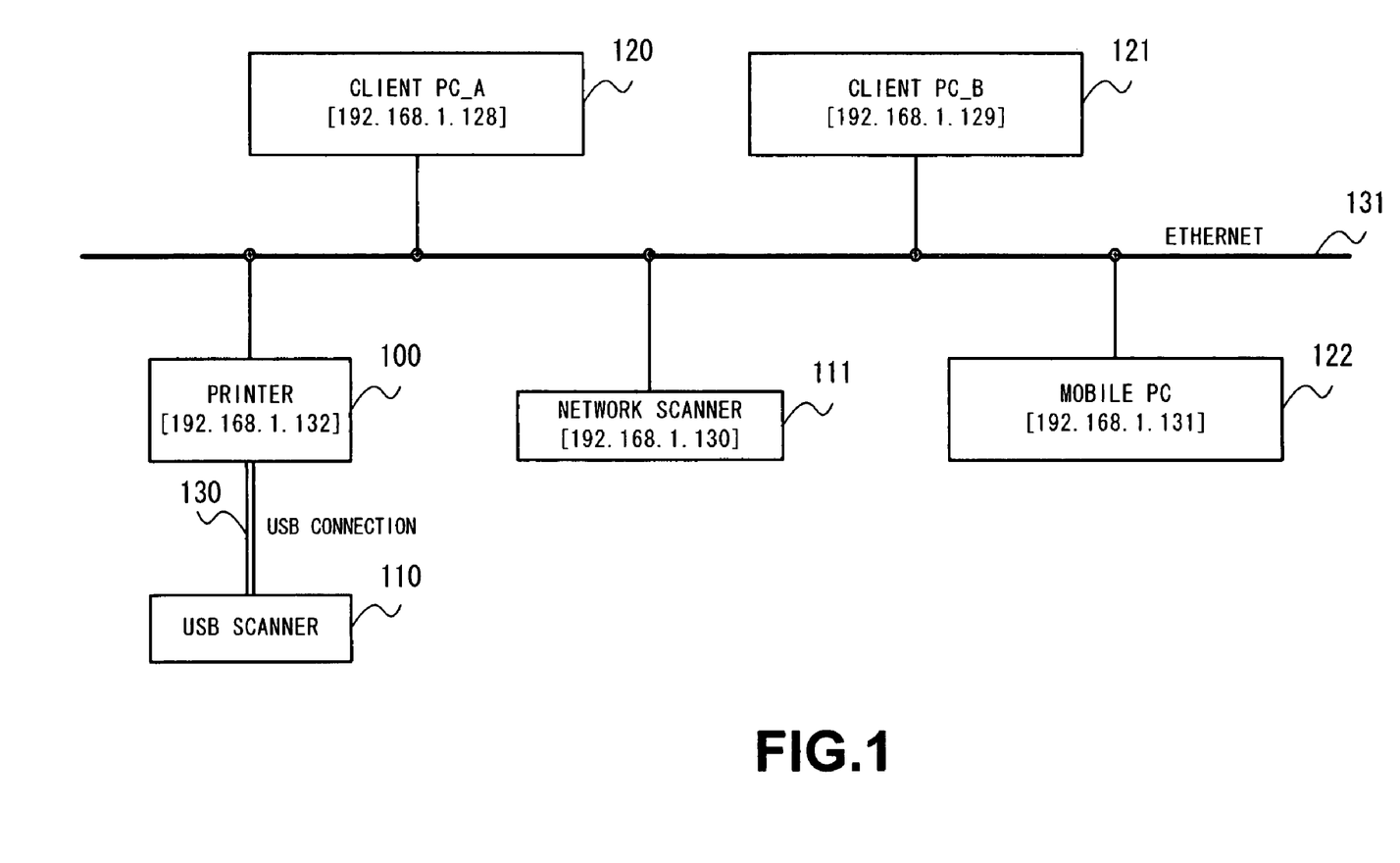
FIG. 1 is a configuration diagram for the system which is configured by applying the printing system and method, and printing apparatus according to an embodiment of the present invention.

FIG. 1 is a configuration diagram for the system which is configured by applying the printing system, printing method and printing apparatus according to an embodiment of the present invention.

The printing system as shown in FIG. 1 is configured to comprise a printer 100, a USB (universal serial bus) scanner 110, a network scanner 111, a client PC_A 120, a client PC_B 121, and a mobile PC_C 122, the printer 100, the network scanner 111, the client PC_A 120, the client PC_B 121, and the mobile PC_C 122 being each network-connected to one another as a node through an Ethernet (registered trademark) cable 131, and the USB (universal serial bus) scanner 110 being P2P (peer-to-peer) connected to the printer 100 through the USB cable 130.

The printer 100 can print output on the basis of the printing request, receiving a printing request from the other nodes existing on the network through the Ethernet (registered trademark) cable 131, and also receiving a printing request directly from the USB scanner 110. In other words, the printer 100 can receive a printing request through a plurality of communication interfaces. The print jobs which have been requested to be printed are stored in the queue, which is a storage area in the printer 100, forming a waiting line, and are sequentially outputted for print under the printing control.

In the queue, the job sender information, which provides information indicating the sender of each print job, is also stored for each print job, and this job sender information includes the interface information indicating the physical connection forms, such as the parallel connection represented by Centronics, the serial connection represented by USB and IEEE (Institute of Electrical and Electronic Engineers) 1394, Ethernet (registered trademark) connection, and the like, and the logical identification information, such as the IP (Internet Protocol) address and the user name.

From this interface information or the identification information, the sender can be identified, and the print jobs which have been stored in the queue, forming a queue, are searched in the direction of from the tail, which is the lowest in the order of printing, to the head, which is the highest in the order of printing, for specifying the print job to be canceled.

Further, the printer 100 carries out the control in which, when a higher-order apparatus, such as a scanner or the like, has issued a printing cancel request, the higher-order apparatus is memorized, and the printing cancel request is made invalid until a printing request is newly received from the higher-order apparatus.

The USB scanner 110 is a higher-order apparatus which is P2P-connected to the printer 100 through the USB cable 130 for carrying out reading of the print medium. The USB scanner 110 issues a printing request to the printer 100 by sending the image data formed by reading out the print medium thereto.

The network scanner 111 is a higher-order apparatus which is network-connected to the printer 100 through the Ethernet (registered trademark) cable 131, and reads out the print medium, issuing a printing request to the printer 100 by sending the image data and the like thereto.

And, this USB scanner 110 and the network scanner 111 can cancel the print job which they themselves have requested to be printed. When the user operates the printing cancel pushbutton or the like to cancel the printing request, the printing cancel request is sent to the printer which has been requested to carry out the printing.

Here is one example of flow of processing in such a scheme until the printing is cancelled.

When the user depresses the printing cancel pushbutton or the like provided in the USB scanner 110 for canceling the printing from the USB scanner 110, the printer 100 which has been just previously requested to make printing is requested to cancel the printing.

The printer 100, which has received the request, identifies the USB scanner 110, which has issued the printing cancel request, on the basis of the above-mentioned job sender information, and searches for the print job which the identified USB scanner 110 has requested to be printed, from the tail to the head of the queue, deleting the print job which has first coincided, from the queue.

And the printer 100 carries out the control in which the printing cancel request from the USB scanner 110 is made invalid until a printing request is newly received from the USB scanner 110 which has issued the printing cancel request.

With such a scheme, the latest print job which the printing cancel requester has requested to be printed can be cancelled.

With this scheme, the print job is searched for in the direction of from the tail to the head of the queue in which the print job is stored, however, the scheme may be adapted such that, among the print jobs submitted from the cancel requester, the print job with which the time and date of sending the job information included in the print job is the latest is canceled.

As described above, the latest job among the print jobs which the cancel requester has requested to be printed can be canceled.

Figure 2:
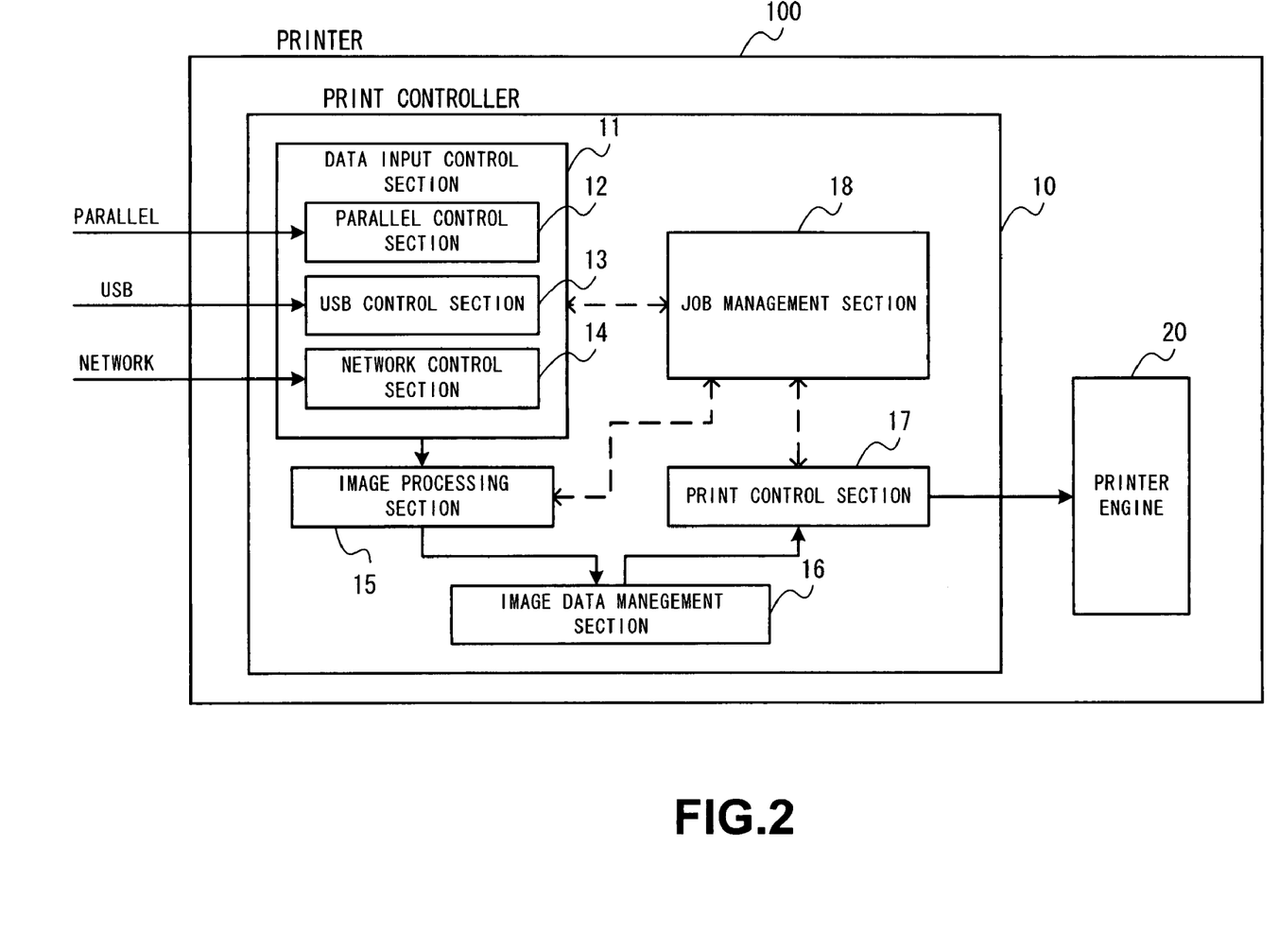
FIG. 2 is a block diagram showing the configuration of the printer in detail.

FIG. 2 is a block diagram showing the configuration of the printer in detail.

FIG. 2 shows the internal configuration of the printer 100 as shown in FIG. 1. The printer 100 is configured to comprise a printer controller 10 and a printer engine 20, the printer controller 10 carrying out the functional control of the printer 100, and the printer engine 20 being the output section for print outputting the print job which has been controlled by the printer controller 10.

The printer controller 10 is configured to comprise a data input control section 11, an image processing section 15, an image data management section 16, a printing control section 17, and a job management section 18.

The data input control section 11 provides an interface for receiving data from the various cables connected to the printer 100, and performs input control in accordance with the interface for each cable. The data inputted through the parallel connection is controlled for input by a parallel control section 12, the data inputted through the USB connection is controlled for input by a USB control section 13, and the data inputted through the network connection is controlled for input by a network control section 14. The data which has been controlled for input by the respective control sections 12 to 14 is sent to the job management section 18 as the print job. If the data which has been received is a printing cancel request for requesting the print job to be canceled, the job management section 18 is notified of the printing cancel request.

Further, the data input control section 11 carries out the control in which, as long as a printing request is not newly received from the printing cancel requester which has issued the printing cancel request, the printing cancel request from the printing cancel requester is made invalid.

The image processing section 15 acquires data transferred from the data input control section 11, and carries out image processing of the image data which has been requested to be printed.

First, from the acquired image data, page data is generated, and the generated page data is stored in the image data management section 16. At this time, the page data includes the page ID allowing the page to be uniquely identified, the printing conditions for that page, and the like, as well as the address indicating the location of the next page.

Next, the storage address of the page data that is possessed by the print job stored in the queue in the job management section 18 under the control by the data control section 11 is updated by the address of the storage location in the image data management section 16 where the print job has been stored.

Figure 5:
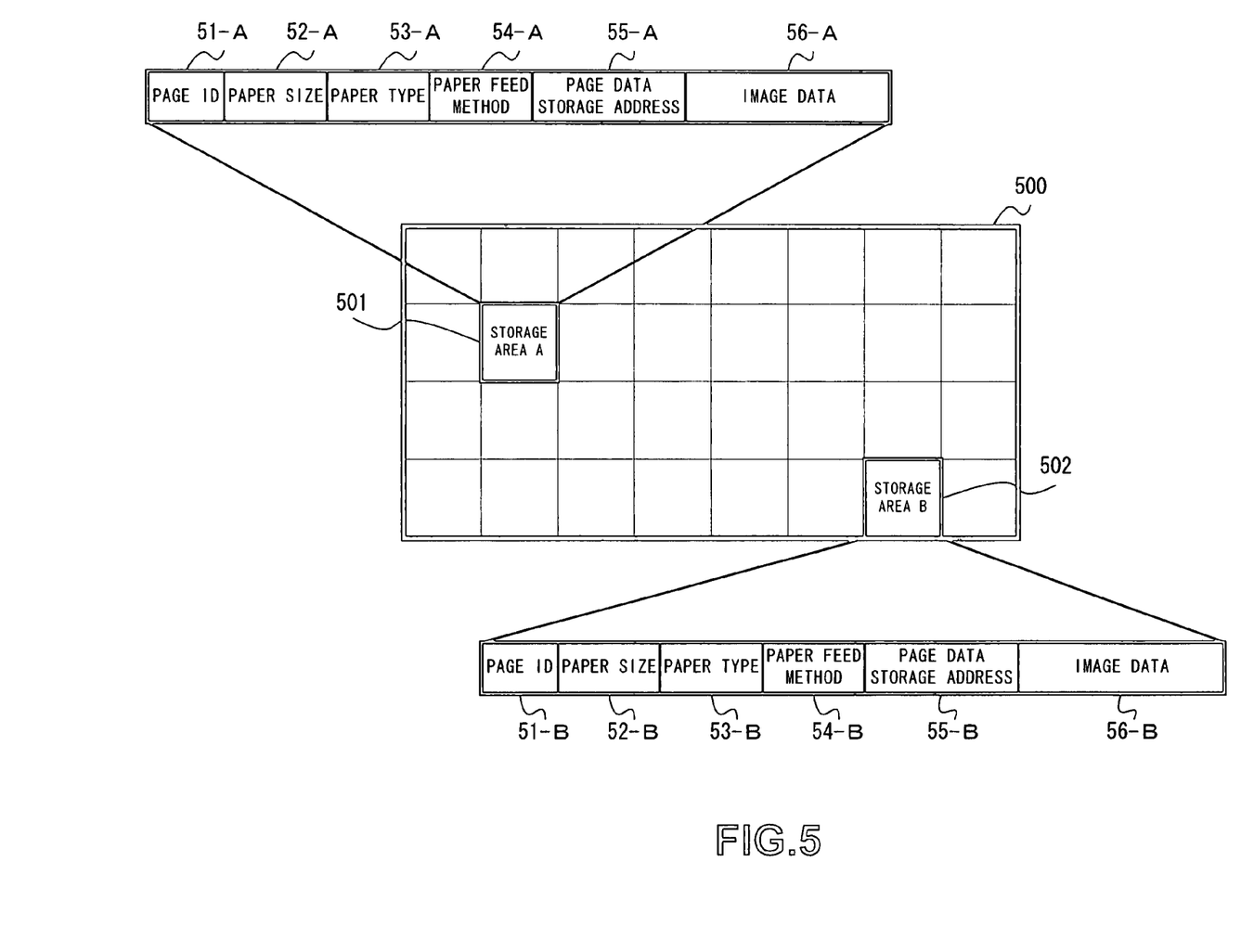
FIG. 5 is a diagram giving an example of the page data stored in the storage area in the image data management section as shown in FIG. 2.

The image data management section 16 carries out management and holding of the page data generated in the image processing section 15. The configuration of the page data at this time is as shown in FIG. 5.

The printing control section 17 acquires the page data managed by the image data management section 16, and carries out the printing control for controlling the printer engine 20 to perform print output.

The job management section 18 receives the data which has controlled by the respective control sections 12 to 14 in the data input control section 11, and manages it as a print job. At this time, a queue is formed in order to control the print jobs on an FIFO (first-in first-out) basis, with which printing output is performed in the order of the data having been received. In addition, the image processing section 15 and the printing control section 17 are controlled such that the print jobs stored in the queue are processed sequentially from the head. Examples of the state of the print jobs stored in the queue in this case and the format for the print jobs are given in FIG. 4A and FIG. 4B, respectively.

Further, the job sender information for each print job which has been requested to be printed is stored in the queue. In the job sender information, the interface information indicating the forms of connection with the printing requester, and the logical identification information, such as the IP address and the user name, are included, and when a printing cancel request is received from the data input control section 11, the cancel requester is identified from these information. On the basis of the information about the cancel requester identified, the print job submitted by the requester is searched for in the direction of from the tail to the head, and by deleting the print job which has coincided, it is canceled from the queue. And, the control in which, as long as a new printing request from the printing cancel requester which has issued the printing cancel request is not issued, the printing cancel request from the printing cancel requester is made invalid is performed.

Thereby, the job which has been last sent can be positively canceled by performing simple processing at any time.

Figure 3:
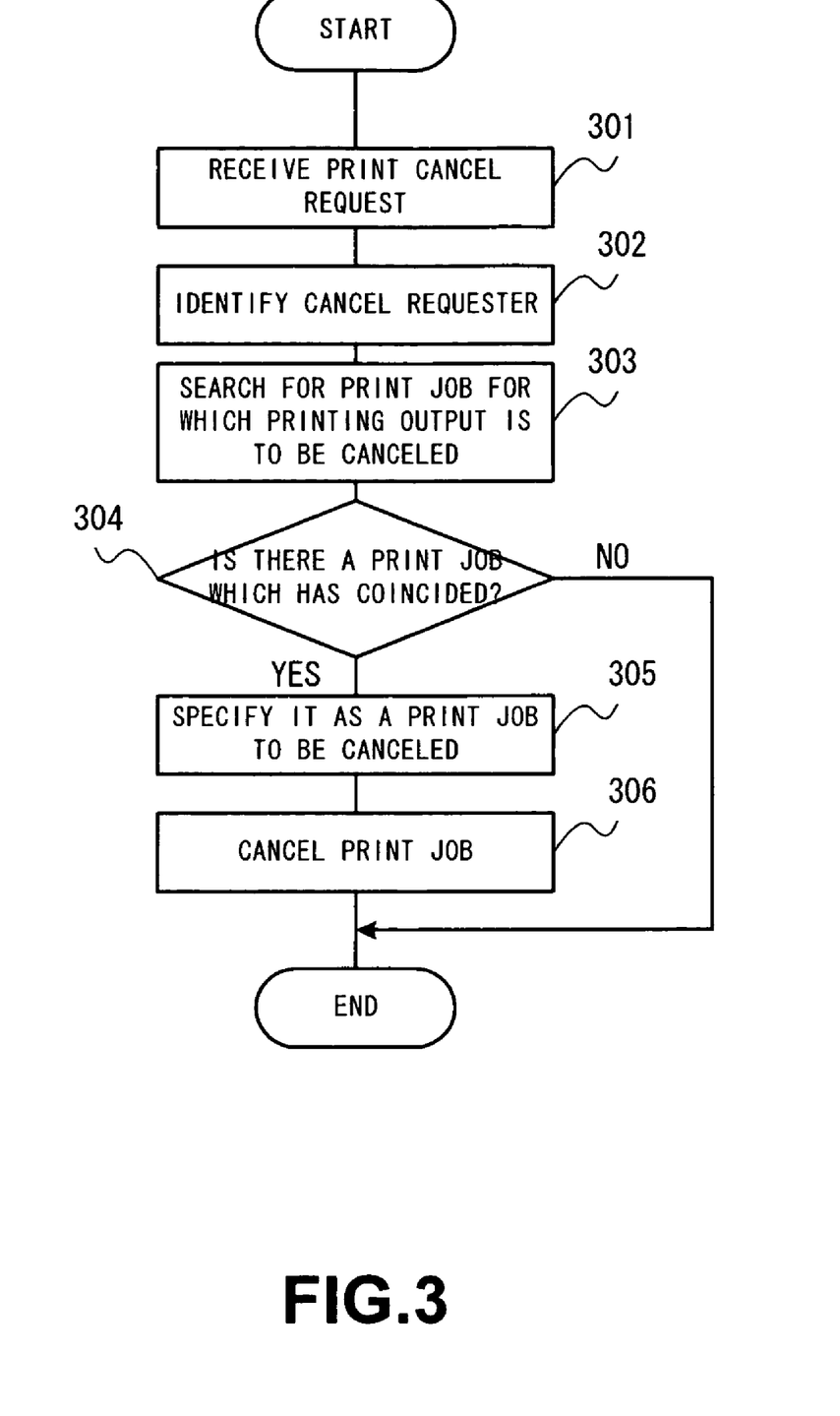
FIG. 3 is a flowchart illustrating the flow of processing for canceling the print job in the printer.

FIG. 3 is a flowchart illustrating the flow of processing for canceling the print job in the printer.

In FIG. 3, when, with a plurality of print jobs being stored in the queue, a print job cancel request is sent from the scanner, the processing is started, the print job cancel request being received (S301), and the cancel requester which has issued the cancel request being identified on the basis of the job sender information which is managed by the job management section (S302). On the basis of the information about the cancel requester identified, the print job which has been requested to be printed by that cancel requester is searched for in the direction of from the tail to the head of the queue (S303).

As a result of the searching, whether or not there is a print job which has coincided is determined (S304); when there is a print job which has coincided (YES at S304), it is specified as a print job to be canceled (S305); and by deleting the print job from the queue, the printing is canceled (S306). When there is no print job which has coincided (NO at S304), the process is ended with the cancel processing being not performed.

Thereby, the printing output can be canceled on the basis of the information about the printing cancel requester.

Figure 4A:
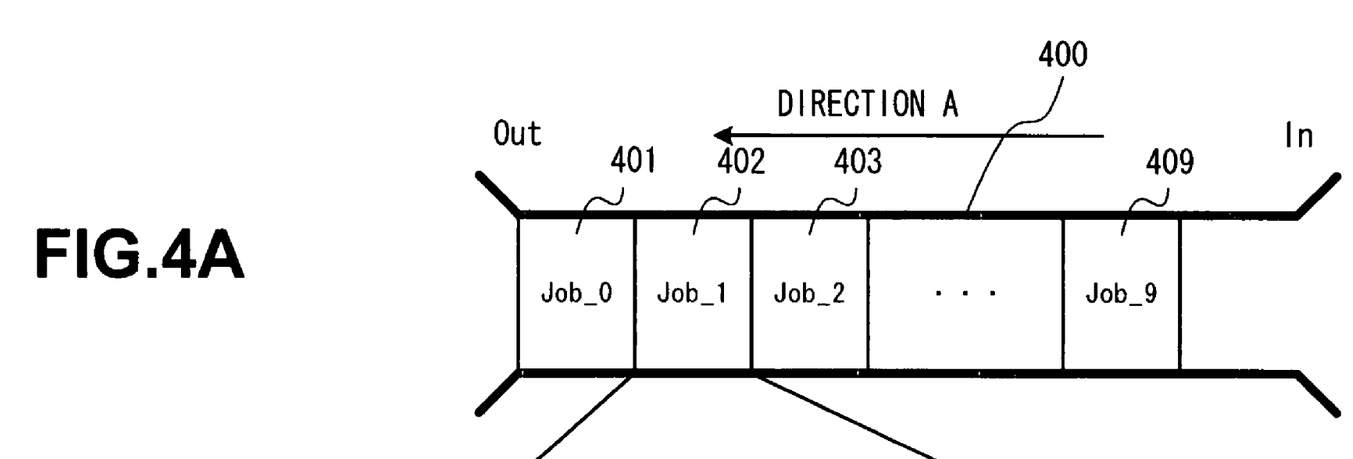
FIG. 4A and FIG. 4B are diagrams illustrating the state of the print jobs stored in the queue in the job management section as shown in FIG. 2, and the format for the print jobs, respectively.
Figure 4B:
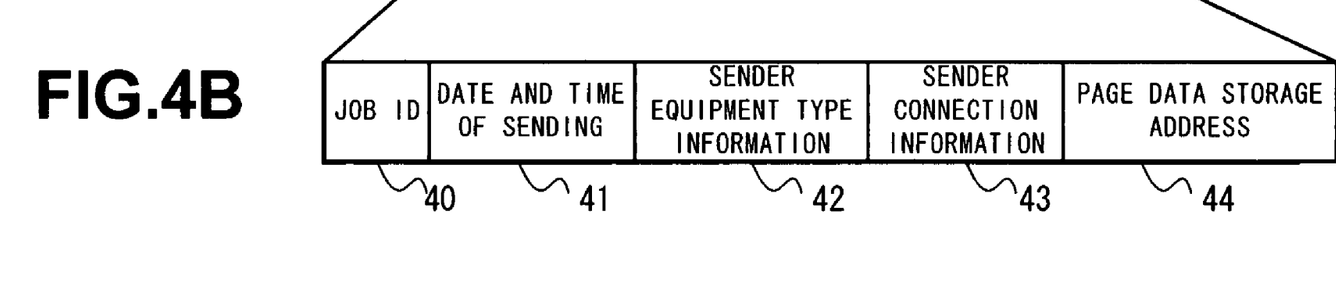

FIG. 4A and FIG. 4B are diagrams illustrating the state of the print jobs stored in the queue in the job management section 18 as shown in FIG. 2, and the format for the print jobs, respectively.

FIG. 4A is a diagram illustrating the state of the queue 400, and FIG. 4B is a diagram illustrating the format for the print jobs stored in the queue as shown in FIG. 4A, respectively.

FIG. 4A gives an example in which ten print jobs having job IDs of "Job_0", "Job_1", "Job_2", . . . , and "Job_9", respectively, are stored, forming a waiting line, the print job with a job ID of "Job_0" being stored at the head of the queue, and the print job with a job ID of "Job_9" being stored at the tail of the queue.

When a particular print job is to be searched for from the tail of the queue, the searching is performed in the direction "A", i.e., the direction of from "In" to "Out" in the figure. In other words, the print job which is to be first searched for is the print job having a job ID of "Job_9", and the print job which is to be second searched for is the print job having a job ID of "Job_8". The "Job_7" and "Job_6" print jobs follow these, and the searching is performed to the last print job with a job ID of "Job_0".

FIG. 4B gives the format for the print job having a job ID of "Job_1" and the other print jobs as shown in FIG. 4A, the format consisting of a job ID 40, a time and date of sending 41, sender equipment type information 42, sender connection information 43, and a page data storage address 44.

The time and date of sending 41 gives information indicating the time and date when the printing request was issued, providing information for specifying the print job which is to be canceled when the printing thereof has been requested to be canceled.

The sender equipment type information 42 is for identification of the equipment type of the apparatus which has issued the printing request to the printer. For example, with the sender equipment type information 42, the equipment type, such as client PC, scanner, or PDA (personal digital assistance, i.e., mobile information terminal), can be identified, and thus the cancel requester for the printing output can be identified on the basis of the equipment type information.

The sender connection information 43 allows the cancel requester to be identified on the basis of the interface information indicating the physical connection form, and the identification information for identifying the printing requester.

The page data storage address 44 gives the address where the page data related to the print job (for example, the print job having a job ID of "Job_1") is stored. The address at this time indicates a particular location in the storage area provided in the image data management section 16 as shown in FIG. 2. When the print job consists of data for a plurality of pages, the address of the head page is indicated.

An example of the storage area at this time provided in the image data management section 16 is given in FIG. 5.

FIG. 5 is a diagram giving an example of the page data stored in the storage area in the image data management section 16 as shown in FIG. 2.

In FIG. 5, the storage area 500 provided in the image data management section 16 as shown in FIG. 2, and how the storage area 500 is divided into a plurality of storage areas are illustrated.

In each storage area as a result of the division of the storage area, page data is stored; the page data stored in the storage area A 501 consisting of a page ID (51-A), a paper size (52-A), a paper type (53-A), a paper feed method (54-A), a page data storage address (55-A), and image data (56-A), and the page data stored in the storage area B 502 consisting of a page ID (51-B), a paper size (52-B), a paper type (53-B), a paper feed method (54-B), a page data storage address (55-B), and image data (56-B).

The page ID (51-A, 51-B) is an identifier which allows the page data to be uniquely identified, and which specifies the conditions related to the printing output for the image data (56-A) with the paper size (52-A), the paper type (53-A), and the paper feed method (54-A), or which specifies the conditions related to the printing output for the image data (56-B) with the paper size (52-B), the paper type (53-B), and the paper feed method (54-B).

The page data storage address (55-A, 55-B) indicates the address of the storage area where the page data for the next page is stored.

Now, let's assume that the page data for the print job having a job ID of "Job_1" as shown in FIG. 4A is that which is stored in the storage area A 501 and the storage area B 502 as shown in FIG. 5, the page data stored in the storage area A 501 being that for the head page, and the page data stored in the storage area B 502 being that for the next page.

Then, in the page data storage address 44 as shown in FIG. 4B, the address indicating the storage area A 501 as shown in FIG. 5 is registered, and in the page data storage address (55-A) possessed by the page data stored in the storage area A 501, the address indicating the storage area B 502 is registered.

In other words, the print job having a job ID of "Job_1" is a print job consisting of two pages, and in print outputting the print job, the page data stored in the storage area A 501 is first printed, and then, the page data stored in the storage area B 502 is printed.

By the way, in the page data storage address (55-B) in the page data stored in the B 502, a "NULL", which indicates that the page is a final one is registered.

As can be seen from the above description, the page data storage address indicates not only the location where the page data for the next page is stored, but also the order of page to be printing-outputted.

Thus, by specifying a particular print job from the queue as shown in FIG. 4A, the page data for the print job can be specified. This means that, by issuing a cancel request for a particular print job, the printing of the page data for the print job can be canceled.

Figure 6:
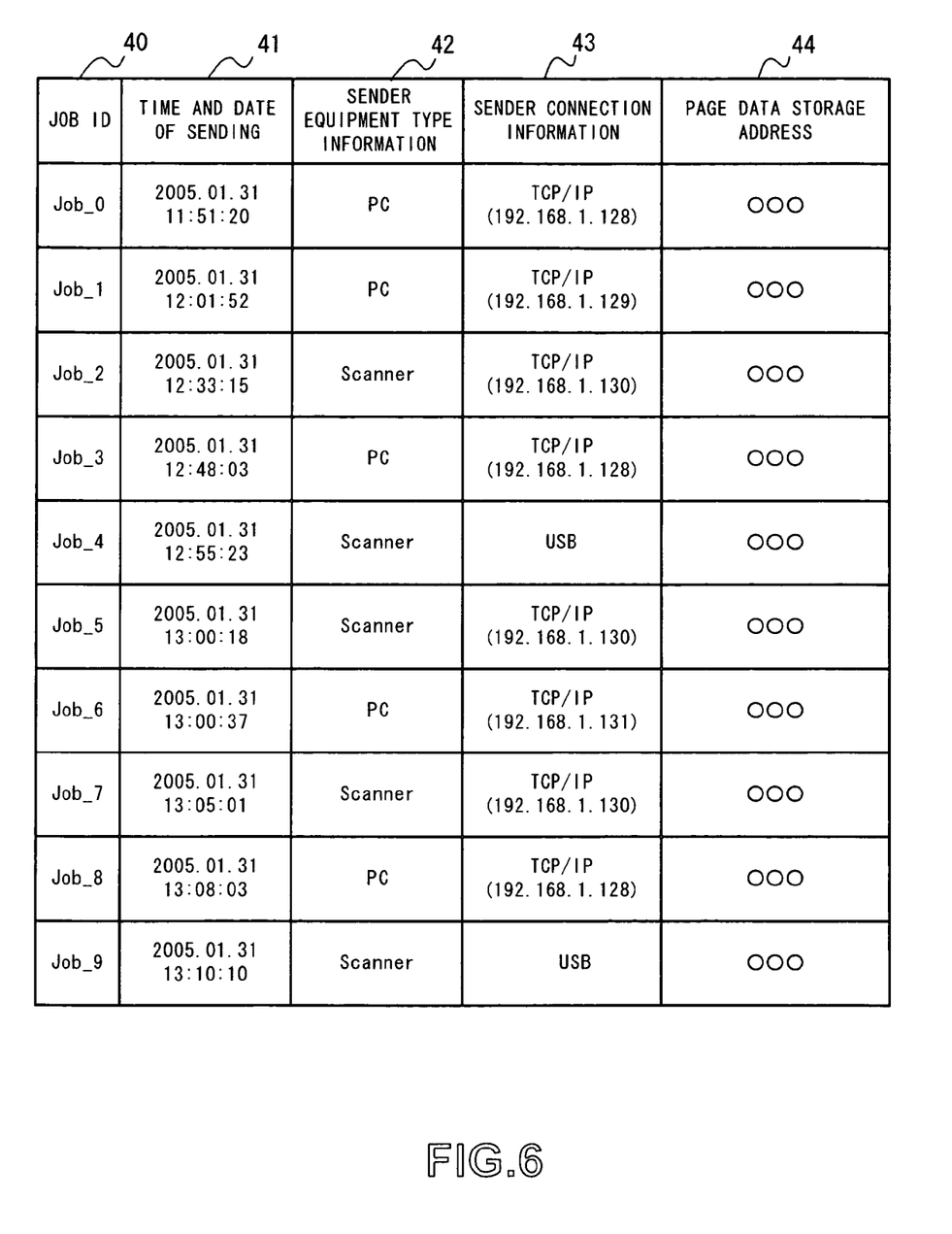
FIG. 6 is a diagram illustrating the job information about the print jobs stored in the queue as shown in FIG. 4A and FIG. 4B.

FIG. 6 is a diagram illustrating the job information about the print jobs stored in the queue as shown in FIG. 4A and FIG. 4B.

In FIG. 6, as the components of the job information format, a job ID 40, a time and date of sending 41, sender equipment type information 42, sender connection information 43, and a page data storage address 44 are given. FIG. 6 indicates that, for the print job having a job ID of "Job_0", for example, the time and date of sending 41 are "11:51:20" and "2005.01.31", respectively; the sender equipment type information 42 is "PC"; and the sender connection information 43 is "TCP/IP (Transmission Control Protocol/Internet Protocol)" (the connection) and "192.168.1.128" (the IP address).

The page data storage address 44 is the address where the head page for the print job is stored, and indicates a particular one of the storage areas in the storage area 500 as shown in FIG. 5.

When the sender connection information 43 for a particular print job is equal to that for another print job having a different job ID, it can be determined that the print jobs are those which have been requested to be printed by the same sender.

For example, the sender connection information 43 for the print job having a job ID of "Job_2" and that for the print job having a job ID of "Job_5" are the same "TCP/IP (Transmission Control Protocol/Internet Protocol)" (the connection) and "192.168.1.128" (the IP address), thus, it can be determined that both print jobs of the job IDs of "Job_2" and "Job_5" are those which have been requested to be printed by the same sender.

And, in order to search for the latest print job among the job information as shown in FIG. 6, the searching is performed in the direction of from "Job_9" to "Job_0".

Through the processing as described above, with the printing system of the present invention, a higher order device which has issued a cancel request for a particular print job can cancel the latest print job among the print jobs which the higher order device itself has requested for printing.

As described above, a first aspect of the present invention provides a printing system having an image reading apparatus and a printing apparatus which is network-connected or locally connected to the image reading apparatus, and which stores print jobs sent from the image reading apparatus or other apparatus in a queue, and implements printing processing sequentially from a print job existing at a head of the queue, in which the image reading apparatus includes: a print job cancel request unit that issues a cancel request for a print job to the printing apparatus, and the printing apparatus includes: a cancel request reception unit that receives the cancel request sent by the print job cancel request unit; a cancel requester identifying unit that identifies a cancel requester from the cancel request received by the cancel request reception unit; a print job specifying unit that specifies, as a canceled print job, a print job which has been first searched out by searching for the print job from the cancel requester identified by the cancel requester identifying unit in a direction from a tail of the queue to the head thereof; and a print job cancel unit that deletes from the queue the canceled print job specified by the print job specifying unit.

A second aspect of the present invention provides the printing system in the first aspect of the invention, in which the print job specifying unit specifies the print job based on the cancel requester identified by the cancel requester identifying unit from job sender information indicating a printing requester for the print job stored in the queue; and the print job cancel unit, when there exist at least two print jobs specified by the print job specifying unit, deletes from the queue a print job having a latest time and date among transmission times included in the job information for the print jobs.

A third aspect of the present invention provides the printing system in the first aspect of the invention, in which the job sender information includes information indicating a form of physical connection with the printing requester, and the cancel requester identifying unit identifies the cancel requester on the basis of the information indicating a connection form in the job sender information.

A fourth aspect of the present invention provides the printing system in the first aspect of the invention, in which the job sender information includes logical identification information for uniquely identifying a printing requester, and the cancel requester identifying unit identifies the cancel requester on the basis of the identification information.

A fifth aspect of the present invention provides the printing system in the first aspect of the invention, in which when the cancel request reception unit receives a cancel request again after having received the cancel request, the cancel requester identifying unit identifies the cancel requester for that cancel request; and when the cancel requester identified by the cancel requester identifying unit has coincided with the cancel requester which has issued the late cancel request, the printing apparatus invalidates the cancel request.

A sixth aspect of the present invention provides a printing method using an image reading apparatus and a printing apparatus which is network-connected or locally connected to the image reading apparatus, and which stores print jobs sent from the image reading apparatus or other apparatus in a queue, and implements printing processing sequentially from a print job existing at the head of the queue, the method including: issuing, by a print job cancel request unit of the image reading unit, a cancel request for a print job to the printing apparatus; receiving, by a cancel request reception unit of the printing apparatus, the cancel request sent by the print job cancel request unit of the image reading apparatus; identifying, by a cancel requester identifying unit of the printing apparatus, a cancel requester from the cancel request received by the cancel request reception unit; specifying, by a print job specifying unit of the printing apparatus, as a canceled print job, the print job which has been first searched out by searching for the print job from the cancel requester identified by the cancel requester identifying unit in the direction from the tail of the queue to the head thereof; and deleting the canceled print job specified by the print job specifying unit from the queue.

A seventh aspect of the present invention provides a printing apparatus which is network-connected or locally connected to an image reading apparatus, and which stores print jobs sent from the image reading apparatus or other apparatus in a queue, and implements printing processing sequentially from a print job existing at a head of the queue, including: a cancel request reception unit that receives a cancel request sent by a print job cancel request unit in the image reading apparatus; a cancel requester identifying unit that identifies a cancel requester from the cancel request received by the cancel request reception unit; a print job specifying unit that specifies, as a canceled print job, the print job which has been first searched out by searching for the print job from the cancel requester identified by the cancel requester identifying unit in a direction from a tail of the queue to the head thereof; and print job cancel unit that deletes the canceled print job specified by the print job specifying unit.

According to the above-mentioned aspects of the present invention, the printing system is configured such that the requester for the printing cancel request is identified; the print job which the requester identified has requested for printing is searched for in the direction from the tail to the head of the queue; and the print job which has coincided in the searching is automatically canceled, thus an effect that the print job from the requester which has issued the printing cancel request can be reliably canceled by making a simple operation is provided.

Further, an effect that, even from an equipment which is low in displaying capacity, the print job can be positively and easily canceled is also provided.

The present invention is applicable to a printing system, printing method, and printing apparatus which cancel the print job from the host computer in a higher-order device connected, and particularly useful for canceling the print job from a higher-order device which is low in displaying capacity.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-81695 filed on Mar. 22, 2005 including specification, claims, drawings and abstract is incorporated herein by reference in its entirety.

What is claimed is:

1. A printing system comprising:
an image reading apparatus;
a printing apparatus which is network-connected or locally connected to the image reading apparatus; and
a storage unit that stores a plurality of print jobs sent from the image reading apparatus in a queue such that the print jobs are extracted and processed sequentially, on a first-in first-out basis, starting from a head of the queue, the storage unit storing multiple print jobs from multiple image reading apparatuses wherein:
the image reading apparatus comprises:
a print job cancel request unit in the image reading apparatus that issues a cancel request to the printing apparatus to cancel a print job in the printing apparatus, and
the printing apparatus comprises:
a cancel request reception unit that receives the cancel request sent by the print job cancel request unit;
a cancel requester identifying unit that identifies the image reading apparatus sending the cancel request by identifying IP address and user name information within the cancel request as received by the cancel request reception unit;
a print job specifying unit that sequentially searches the queue, starting from within the queue at a tail of the queue and progressing towards a head of the queue while keeping print jobs inside the queue, and specifies the print job to be cancelled, the print job originating from the image reading apparatus sending the cancel request as determined by the identified IP address and user name information and canceling the first print job found amongst the queued print jobs originating from the image reading apparatus while leaving print jobs from other image reading apparatuses in the queue; and
a print job cancel unit that deletes from the queue the print job specified by the print job specifying unit,
wherein during a period after the print job is deleted from the queue according to the cancel request until a new printing request is received from the image reading apparatus which issued the cancel request as a print requester, the print job specifying unit invalidates any cancel request received subsequent to the issued cancel request from the image reading apparatus as a cancel requester.

2. The printing system of claim 1, wherein:
the print job specifying unit specifies the print job based on the cancel requester identified by the cancel requester identifying unit from job sender information indicating a printing requester for the print job stored in the queue, and
the print job cancel unit, when there exist at least two print jobs specified by the print job specifying unit, deletes from the queue a print job having a latest time and date among transmission times included in the job information for the print jobs.

3. The printing system of claim 1, wherein:
the job sender information includes information indicating a form of physical connection with the printing requester, and
the cancel requester identifying unit identifies the cancel requester on the basis of the information indicating a connection form in the job sender information.

4. The printing system of claim 1, wherein:
the job sender information includes logical identification information for uniquely identifying a printing requester, and
the cancel requester identifying unit identifies the cancel requester on the basis of the identification information.

5. The printing system of claim 1, wherein:
when the cancel request reception unit receives a cancel request again after having received the cancel request, the cancel requester identifying unit identifies the cancel requester for that cancel request; and
when the cancel requester identified by the cancel requester identifying unit has coincided with the cancel requester, which has issued the late cancel request, the printing apparatus invalidates the cancel request.

6. A printing method using an image reading apparatus and a printing apparatus which is network-connected or locally connected to the image reading apparatus, the method comprising:
storing, in a storage unit of the printing apparatus or other apparatus, a plurality of print jobs sent from the image reading apparatus in a print queue such that the print jobs are extracted and processed sequentially, on a first-in first-out basis, starting from the head of the print queue, the storage unit storing multiple print jobs from multiple image reading apparatuses,
issuing, by a print job cancel request unit of the image reading apparatus, a cancel request for a print job to the printing apparatus, the print job cancel request unit issues the cancel request to the printing apparatus to cancel a print job in the printing apparatus;
receiving, by a cancel request reception unit of the printing apparatus, the cancel request sent by the print job cancel request unit of the image reading apparatus;
identifying, by a cancel requester identifying unit of the printing apparatus, the image reading apparatus sending the cancel request by identifying IP address and user name information within the cancel request as received by the cancel request reception unit;
searching the queue, starting from within the queue at a tail of the queue and sequentially progressing towards a head of the queue while keeping print jobs inside the queue;
specifying, by a print job specifying unit of the printing apparatus, the print job to be cancelled, the print job originating from the image reading apparatus sending the cancel request as determined by the identified IP address and user name information;
canceling the first print job found amongst the queued print jobs originating from the image reading apparatus while leaving print jobs from other image reading apparatuses in the print queue;
deleting the print job specified by the print job specifying unit from the queue; and
invalidating any cancel request received subsequent to the issued cancel request from the image reading apparatus as a cancel requester during a period after the print job is deleted according to the cancel request until a new printing request is received from the image reading apparatus which issued the cancel request as a print requester.

7. A printing apparatus which is network-connected or locally connected to an image reading apparatus, the printing apparatus comprising:
a storage unit that stores a plurality of print jobs sent from the image reading apparatus or other apparatus in a print queue such that the print jobs are extracted and processed sequentially, on a first-in first-out basis, starting from a head of the print queue, the storage unit storing multiple print jobs from multiple image reading apparatuses;
a cancel request reception unit that receives a cancel request sent by a print job cancel request unit in the image reading apparatus, the print job cancel request unit issues the cancel request to the printing apparatus to cancel a print job in the printing apparatus;
a cancel requester identifying unit that identifies the image reading apparatus sending the cancel request by identifying IP address and user name information within the cancel request as received by the cancel request reception unit;
a print job specifying unit that sequentially searches the queue, starting from within the queue at a tail of the queue and progressing towards a head of the queue while keeping print jobs inside the queue, and specifies the print job to be cancelled, the print job originating from the image reading apparatus sending the cancel request as determined by the identified IP address and user name information and canceling the first print job found amongst the queued print jobs originating from the image reading apparatus while leaving print jobs from other image reading apparatuses in the print queue; and
a print job cancel unit that deletes the print job specified by the print job specifying unit,
wherein during a period after the print job is deleted according to the cancel request until a new printing request is received from the image reading apparatus which issued the cancel request as a print requester, the print job specifying unit invalidates any cancel request received subsequent to the issued cancel request from the image reading apparatus as a cancel requester.

8. The printing system of claim 1,
wherein the print job to be canceled is stored in a storage area of the storage unit, and each page of the print job to be canceled includes a page data storage address identifying a storage address of a next page of the print job, and when the print job to be canceled is identified, the print job is canceled by identifying a location of each next page from the page data storage address.

9. The printing method of claim 6,
wherein the print job to be canceled is stored in a storage area of the storage unit, and each page of the print job to be canceled includes a page data storage address identifying a storage address of a next page of the print job, and when the print job to be canceled is identified, the print job is canceled by identifying a location of each next page from the page data storage address.

10. The printing apparatus of claim 7,
wherein the print job to be canceled is stored in a storage area of the storage unit, and each page of the print job to be canceled includes a page data storage address identifying a storage address of a next page of the print job, and when the print job to be canceled is identified, the print job is canceled by identifying a location of each next page from the page data storage address.

* * * * *